United States Patent [19]
Wood et al.

[11] 3,833,386
[45] Sept. 3, 1974

[54] METHOD OF PREPAIRING POROUS CERAMIC STRUCTURES BY FIRING A POLYURETHANE FOAM THAT IS IMPREGNATED WITH INORGANIC MATERIAL

[75] Inventors: Louis L. Wood, Potomac, Md.; Philip Messina, Colonia, N.J.; Kurt C. Frisch, Grosse Ile, Mich.

[73] Assignee: W. R. Grace & Co., New York, N.Y.

[22] Filed: July 7, 1972

[21] Appl. No.: 269,626

[52] U.S. Cl......... 106/41, 260/2.5 AK, 260/2.5 BD, 264/44, 264/DIG. 17, 264/DIG. 48, 264/DIG. 77, 264/DIG. 36
[51] Int. Cl.......................... B29d 27/08, C08j 1/14
[58] Field of Search........... 264/43, 44; 260/2.5 AK; 106/41

[56] References Cited
UNITED STATES PATENTS

| | | | |
|---|---|---|---|
| 2,726,219 | 12/1955 | Hill | 260/2.5 AP |
| 2,929,800 | 3/1960 | Hill | 260/77.5 AM |
| 3,175,918 | 3/1965 | McGahan et al. | 106/55 |
| 3,345,440 | 10/1967 | Googin et al. | 264/44 |
| 3,387,940 | 6/1968 | McHenry et al. | 264/44 |
| 3,598,772 | 8/1971 | Hood et al. | 260/2.5 AK |
| 3,706,678 | 12/1972 | Dietrich | 260/2.5 AD |

FOREIGN PATENTS OR APPLICATIONS

| | | | |
|---|---|---|---|
| 694,095 | 9/1964 | Canada | 264/41 |

OTHER PUBLICATIONS

J. H. Saunders & K. C. Frisch, Polyurethanes Chemistry and Technology, Vol. XVI-Part 1, 1963, pp. 284 & 292–296.

*Primary Examiner*—Donald E. Czaja
*Assistant Examiner*—Gary R. Marshall
*Attorney, Agent, or Firm*—Eugene M. Bond

[57] ABSTRACT

The invention disclosed is for ceramic foam structures prepared by reacting an isocyanate capped polyoxyethylene polyol reactant with large amounts of an aqueous reactant containing finely divided sinterable ceramic material. The resultant foams having the sinterable ceramic material dispersed thereon are heat treated to decompose the carrier foam under firing conditions which sinter the ceramic particles resulting in a rigid ceramic foam structure.

17 Claims, No Drawings

METHOD OF PREPAIRING POROUS CERAMIC STRUCTURES BY FIRING A POLYURETHANE FOAM THAT IS IMPREGNATED WITH INORGANIC MATERIAL

This invention relates to ceramic foam structures prepared by using hydrophilic crosslinked polyurethane foams as a carrier. More particularly, the present invention relates to use of hydrophilic foams prepared from a capped polyoxyethylene polyol reactant which is then admixed with large amounts of an aqueous reactant containing finely divided sinterable ceramic material. The generated foams having sinterable ceramic material dispersed thereon are then fired to sinter the ceramic particles and thereby decompose the foam carrier.

By the present method, ceramic structures may be prepared using hydrophilic crosslinked polyurethane foams by reacting a particular isocyanate capped polyoxyethylene polyol with large amounts of an aqueous slurry of sinterable ceramic material. The thus generated foams having sinterable material uniformly disposed throughout are then fixed to sintering temperatures for preparing a rigid ceramic foam structure.

Generally stated, the present method includes reacting an isocyanate capped polyoxyethylene polyol by combining with an aqueous slurry of sinterable ceramic material, and thereby effecting foaming after which the foamed product is fixed to sintering temperatures. A rigid ceramic foam structure results from the firing step.

Crosslinked hydrophilic foam used as a carrier for sinterable material may be prepared by capping polyoxyethylene polyol with a polyisocyanate such that the capped product has a reaction functionality greater than two. The capped product is foamed simply by combining with an aqueous reactant. Optionally, the capped product and/or aqueous reactant may contain a suitable crosslinking agent if desired, in which case the capped polyoxyethylene polyol product may have a functionality approximating 2.

During capping, it is desirable that polyisocyanate be reacted with the polyol such that the reaction product, i.e., the capped product, is substantially void of reactive hydroxy groups while containing more than two reactive isocyanate sites per average molecule. Another route for achieving this desired result is to react a polyisocyanate having two reactive active isocyanate sites per average molecule, in a reaction system during foaming having a polyfunctional reactive component such as one having from three up to about six or more reactive amine, hydroxy, thiol, or carboxylate sites per average molecule. These latter sites are highly reactive with the two reactive isocyanate sites and thereby form a dimensional product.

Polyoxyethylene polyol used as a reactant in preparing the capped product to be foamed may have a weight average molecular weight of about 200 to about 20,000, and preferably between about 600 to about 60,000, with a hydroxyl functionality of about 2 or greater, preferably from about 2 to about 6.

Polyoxyethylene polyol is terminated or capped by reaction with a polyisocyanate. The reaction may be carried out in an inert moisture-free atmosphere such as under a nitrogen blanket at atmospheric pressure at a temperature in the range of from about 0°C. to about 120°C. for a period of time of about 20 hours depending upon the temperature and degree of agitation. This reaction may be effected also under atmospheric conditions provided the product is not exposed to excess moisture. The polyisocyanates used for capping the polyoxyethylene polyol include polyisocyanates and polyisothiocyanates which are PAPPI-1 (a polyaryl polyisocyanate as defined in U.S. Pat. No. 2,683,730), tolylene diisocyanate, triphenylmethane-4,4',4'',-triisocyanate, benzene-1,3,5-triisocyanate, toluene-2,4,6-triisocyanate, diphenyl-2,4,4'-triisocyanate, hexamethylene diisocyanate, xylene diisocyanate, chlorophenylene diisocyanate, diphenylmethane-4,4'-diisocyanate, naphthalene-1, 5-diisocyanate, xylene-alpha, alpha'-diisothiocyanate, 3,3'-dimethyl-4,4'-biphenylene diisocyanate, 2,2',5,5'-tetramethyl-4, 4'-biphenylene diisocyanate, 4,4'-methylenebis (phenylisocyanate), 4,4'-sulfonylbis (phenylisocyanate), 4,4'-methylene di-orthotolylisocyanate, ethylene diisocyanate, ethylene diisothiocyanate, trimethylenediisocyanate and the like. Mixtures of any one or more of the above mentioned organic isothiocyanates or isocyanates may be used as desired. The aromatic diisocyanates and polyisocyanates or mixtures thereof which are especially suitable are those which are readily commercially available, have a high degree of reactivity and a relatively low cost.

Capping of the polyoxyethylene polyol may be effected using stoichiometric amounts of reactants. Desirably, however, an excess of isocyanate is used to insure complete capping of the polyol. Thus, the ratio of isocyanate groups to the hydroxyl groups used for capping is between about 1 to about 4 isocyanate to hydroxyl, and preferably about 2 to about 3 isocyanate to hydroxyl molar ratio.

To obtain the maximum strength, resistance to compression set and the like, the isocyanate capped polyoxyethylene polyol reaction products are formulated in such a manner as to give crosslinked, three dimensional network polymers on foaming. In order to achieve such infinite network formation on foaming, the reactive components may be formulated in one of the following by way of example. First, when water slurry is the sole reactant with the isocyanate groups leading to chain growth during the foaming process, the isocyanate capped polyoxyethylene polyol reaction product must have an average isocyanate functionality greater than 2 and up to about 6 or more depending upon the composition of the polyol and capping agent components. Secondly, when the isocyanate capped polyoxyethylene polyol has an isocyanate functionality of only about two, then the water slurry, i.e., aqueous reactant, used may contain a dissolved or dispersed isocyanate-reactive crosslinking agent having an effective functionality greater than two. In this case, the reactive crosslinking agent is reacted with the capped polyoxyethylene polyol when admixed during and after the foaming process has been initiated. Thirdly, when the isocyanate capped polyoxyethylene polyol has an isocyanate functionality of only about two, then a polyisocyanate crosslinking agent having an isocyanate functionality greater than two may be incorporated therein, either preformed or formed in situ, and the resultant mixture may then be reacted with water slurry, i.e., aqueous reactant, optionally containing a dissolved or dispersed reactive isocyanate-reactive crosslinking agent, leading to a crosslinked, infinite network hydrophilic polyurethane foam.

Several different modes may be used to prepare the hydrophilic capped polyoxyethylene polyol reaction product having an average isocyanate functionality greater than two. One useful mode is to polymerize ethylene oxide in the presence of a polyfunctional hydroxyl containing starter component such as glycerol, trimethylolpropane, or trimethylolethane and the like which leads to polyoxyethylene triols. The molecular weight of these polymeric triols so prepared may be varied greatly depending on the number of moles of ethylene oxide used in the reaction with the starter

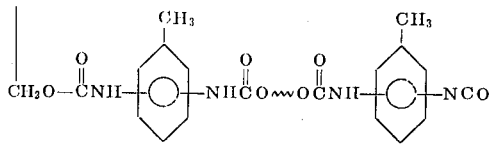

Any polyoxyethylene diols, triols, tetrols or hexols may be capped with isocyanate end groups by reaction with an appropriate amount of a polyisocyanate. The end capping reaction may be exemplified by the following illustrative equation:

Reaction III

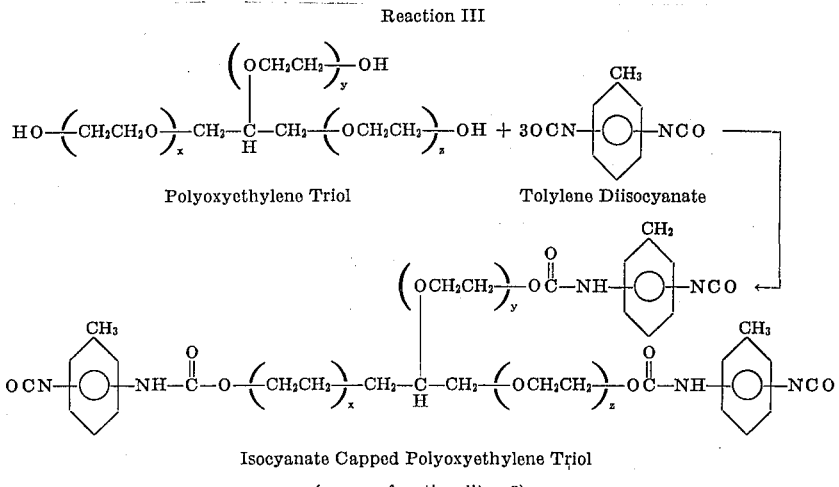

Isocyanate Capped Polyoxyethylene Triol (average functionality=3)

component. Starter components such as pentaerythritol and sucrose likewise treated with ethylene oxide lead to polymeric polyoxyethylene tetrols and hexols, respectively. Alternatively, polyols suitable for capping with polyisocyanate may be prepared from diols, triols, tetrols, hexols and polycarboxylic acids such as by the following mode:

Reaction I

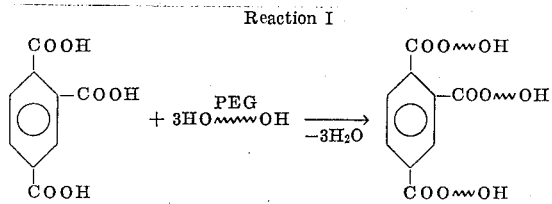

A useful polyisocyanate may be prepared from the reaction of a polyol with excess diisocyanate such as by the following mode:

Reaction II

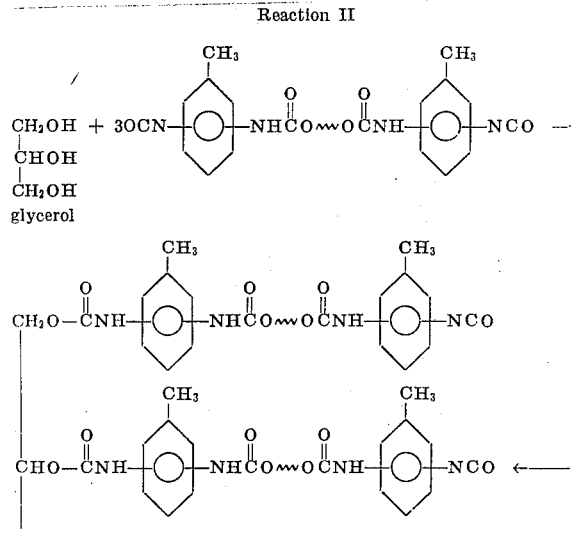

Obviously the exact structure of the isocyanate capped polyoxyethylene polyols may be very complex and the simplified version shown in the above reactions is for purposes of illustration only. Further, blends or mixtures of the various polyols and/or polyisocyanates may be used as desired so long as the total average isocyanate functionality of the final urethane containing reaction product is greater than two.

Another possible mode used to prepare the capped polyoxyethylene polyol reaction product having an average isocyanate functionality greater than two is by reacting polyoxyethylene glycol having a reactive functionality equal to 2, with a molar excess of a diisocyanate which leads to an isocyanate capped polyurethane product (A) having an isocyanate functionality of two. A polyol such as pentaerythritol having a reactive functionality equal to 4 is reacted with a large molar excess of a diisocyanate to form an isocyanate capped polyurethane intermediate product (B) having an isocyanate functionality of four. By blending the two isocyanate capped products thus prepared, i.e., products (A) and (B), in various molar proportions, the resulting product mixture has an average isocyanate functionality greater than two and on treatment with aqueous reactants will lead to new improved hydrophilic crosslinked polyurethane foams illustrative of the present invention. In addition, other monomeric or polymeric polyisocyanate crosslinking agents may be substituted for the tetraisocyanate product (B). Tolylene-2,4,6-triisocyanate having a reactive functionality of 3 is an example of a simple monomeric triisocyanate which may be usefully employed to achieve the same objective of imparting to the system an average isocyanate functionalitiy greater than two. An example of a polymeric triisocyanate which may be similarly used is that shown in the descriptive Reaction III.

Still another useful mode within the scope of this invention for preparing crosslinked hydrophilic polyurethane foams is by using an isocyanate capped polyoxyethylene polyol reaction product having an average functionality of about two or greater which may be prepared as described previously. The technique following is crucial for those formulations where the average isocyanate functionality is only about two, because in these instances treatment with a large amount of water slurry in foaming yields only a substantially linear, soluble thermoplastic foam having very little, if any, practical or commercial utility. Thus, when it is desired to carry out the foaming reaction using this latter technique, the water slurry, i.e., aqueous reactant used, is pre-treated to contain a polyfunctional crosslinking agent which is reactive with isocyanate end groups of the capped reaction product. Such crosslinking agents may be solubilized or dispersed in the water slurry, i.e., aqueous reactant, and must be sufficiently compatible with the capped reaction product to be able to react with the isocyanate groups and thus cause a crosslinked, insoluble, thermosetting network to form while the foaming process takes place. In this technique, then, a crosslinking agent reactive with isocyanate groups is contained in the water slurry, i.e., aqueous reactant. After mixing with the isocyanate capped polyoxyethylene polyol reaction products, a crosslinking reaction results which takes place during and after the foaming step begins to take place. The presence of the crosslinking agent in the water slurry or aqueous reactant is crucial when the isocyanate capped reaction product has a functionality of only about two and only optional when the functionality thereof is greater than two.

Water soluble or water dispersible crosslinking agents operable in this invention desirably should be polyfunctional and reactive with isocyanate groups and include but are not limited to materials such as diethylenetriamine, triethylenetetramine, tetraethylenepentamine, polyethyleneimine, glycerol, trimethylolpropane, pentaerythritol, tolylene-2,4,6-triamine, ethylene diamine, amino-ethanol, trimethylenediamine, tetramethylenediamine, pentamethylene-diamine, hexamethylenediamine, ethanolamine, diethanolamine, hydrazine, triethanolamine, benzene-1,2,4-tricarboxylic acid, nitrilotriacetic acid, citric acid, 4,4'-methylenebis(o-chloroaniline), and the like. The water soluble or water dispersible crosslinking agents chosen are those which cause a crosslinked network to form during or after the foaming process begins to take place.

It has also been found that the capped polyoxyethylene polyol having an isocyanate functionality greater than two used to prepare a three dimensional network polymer must be present in an amount sufficient to insure formation of the dimensional network. Thus, amounts of the capped polyoxyethylene polyol having an isocyanate functionality greater than two in the component to be foamed range from about 3 percent by weight of this component up to 100 percent by weight. Thus, it is possible to include a capped polyoxyethylene polyol having a terminal member with an isocyanate functionality of two, i.e., a diisocyanate in an amount from 0 percent by weight up to about 97 percent by weight of the component to be foamed. The maximum amounts of diisocyanate used are limited to that necessary to permit crosslinking to take place during foaming, as contrasted to formation of a linear polymeric structure, and the properties desired in the finally prepared foam.

The polyoxyethylene polyols used herein are water soluble reaction products derived from the polymerization of ethylene oxide in the presence of a polyfunctional starter compound such as water, ethylene glycol, glycerol, pentaerythritol, sucrose and the like. The molecular weights may be varied over a wide range by adjusting the relative ratios of ethylene oxide monomer to starter compound. The preferred molecular weight ranges have been described previously.

It is possible and sometimes desirable to incorporate small amounts of a relatively hydrophobic comonomer into the ethylene oxide based polymerization products. Thus, comonomers such as propylene oxide or butylene oxide may be copolymerized as a random copolymer, block-copolymer, or both, such that the copolymers remain hydrophilic while having other desirable features for certain applications, namely, improved low temperature flexibility, resistance to compression set, resiliency and the like. Up to about 40 mole percent but desirably about 25 mole percent or less of the relatively hydrophobic comonomer may be copolymerized with the ethylene oxide monomer and still yield hydrophilic crosslinked network foams when those products are used as polyol intermediates. Thus, as used herein, the term "polyoxyethylene polyol" is intended to include not only homopolymers of ethylene oxide but also hydrophilic copolymers of ethylene oxide such as those described above wherein all of these polyol derivatives have a hydroxyl functionality of about two or greater and an ethylene oxide content ranging from about 60 mole percent to about 100 mole percent, and preferably greater than about 75 mole percent.

To effect foaming and preparation of the crosslinked network polymer, the component including the isocyanate capped polyoxyethylene polyol having a functionality about 2 or greater is simply combined with the aqueous component. For simplicity, this isocyanate capped reaction component will herein be referred to as resin reactant.

The aqueous component, i.e., water slurry or suspension, includes finely divided sinterable ceramic materials disposed therein.

In contrast to typical polyurethane reactions such as those using catalyst or like promotors where one mole of -NCO is reacted with one half mole water, the present reaction proceeds simply with a large but controlled excess of water.

Using the present resin reactant and water in amounts from about 0.5 mole $H_2O$/mole NCO groups up to about 2 moles $H_2O$/mole NCO groups results in poor foaming unless materials such as surfactants, catalysts or the like are included. When using about 6.5 moles $H_2O$ mole/NCO groups up to about 390 moles $H_2O$/mole NCO groups, surprisingly good foams result which improve in characteristics with added amounts of molar water. Thus, the available water content in the aqueous reactant is from about 6.5 to about 390 moles $H_2O$/NCO groups in the resin reactant, and desirably from about 20 to about 200 on the same basis.

"Available water" in the aqueous reactant is that water accessible for reaction with the resin reactant, and which is exclusive of water which may layer during reaction, or supplemental water which may be necessary because of water-absorbtive or water-binding properties of the finely divided sinterable ceramic additive present in and forming the aqueous reactant.

Because large amounts of water are in the aqueous reactant during reaction, i.e., the present system is not dependent upon a molar NCO-water type reaction, it is possible to combine a great variety of sinterable materials in the aqueous reactant which are otherwise not possible with limited water reacting systems.

The aqueous reactant may be used at temperatures from about 10°C. to about 100°C. as desired.

Large amounts of sinterable materials may be added to the aqueous reactant. These materials may be added in an amount of about 20 to about 1000 parts by weight sinterable material per 100 parts by weight prepolymer to be foamed.

Virtually any sinterable material may be used in the present invention. Useful examples include borosilicates, soda-lime-silicates, porcelain, samaria, gadolinia, sillimanite, magnesium silicate, thoria, urania, steatite, magnesia, zircon, zirconia, petalite, spodumene, cordierite, fosterite, corundum, spinel barium titanate, various carbides including boron carbide and metal systems such as aluminum powder, nickel powder or the like, along with a binder, fluxing agent and a liquid carrier. In the latter case, the foamed structure is fired in oxygen to burn out the carrier foam and oxidize the aluminum. Rigid foam structures may also be prepared by combining sinterable materials such as sinterable ceramic and metal mixtures, especially chromium and alumina mixtures.

Non-refractory materials may be included such as fluxes or the like. Non-refractory fluxes include alkaline earth oxides, fluorides, nitrates and the like.

A wide variety of solid materials may be added to the aqueous reactant to influence changes in properties, particularly to improve load-bearing characteristics. These solid materials which may be added include finely divided solid particles or powders, powdered metals, activated charcoal, carbon blacks, and the like.

Various conventional radiation barrier materials such as lead, boron hydrides, hafnium titanate and the like may also be combined with the aqueous reactant.

Additional optional materials which may be included in the foaming system include from 0 to 5 parts by weight of a catalyst exemplified by amines and tin compounds, per 100 parts by weight prepolymer to be foamed; and surfactants such as silicones and the like in amounts of 0 to 5 parts by weight per 100 parts by weight prepolymer.

Although foaming of the present resin reactant, i.e., prepolymer, is effected simply, it is also possible to add, although not necessary, supplemental foaming materials such as those well known to the artificial sponge foaming art.

After foaming has been effected, the foam may be dried, if desired, under vacuum from 1 to 760 Torr at a temperature of about 0° to about 150°C.

The foam, either wet or dry, is fired using a temperature profile of about 100°C. to about 200°C. rise per hour, with firing being effected at about 500°C. to about 2000°C. for about 0.5 to about 5 hours using an atmosphere of air, oxygen, inert gases or the like.

The fired foam structures of the present invention have many uses such as nuclear reactor components, filters, acoustical insulators, electrical insulators and thermal insulators, noise suppressors or mufflers, components of aircraft and missiles, radomes, circuit bases, wave guides, combustion ports, rocket nozzles and vanes, base support structure for ablation materials, heat exchangers for vehicle afterburners and the like.

The following examples will aid in explaining, but should not be deemed as limiting, practice of the present invention. In all cases, unless otherwise noted, all parts and percentages are by weight.

EXAMPLE 1

To a reaction vessel containing 3,092 grams, representing 1 mole, 3 eq. OH, of a triol prepared from potassium hydroxide catalyzed reaction of 92 grams anhydrous glycerol with 3300 grams of ethylene oxide, were added 522 grams, representing 3 moles, 6 eq. NCO of tolylene diisocyanate having about 80/20 mixture of 2,4 isomer/2,6 isomer. The reaction exotherm was kept at 70°C. by external cooling with water, while stirring for 4 hours. The actual isocyanate content, determined by titration with standard n-butylamine solution in toluene, remained at the constant level of 0.79 meq. NCO/gram relative to a theoretical content of 0.83 meq. NCO/gram. The resultant pale yellow syrup was found to solidify at about 30°–35°C., was soluble in toluene, and acetone, readily reacts with water, and had the following formula:

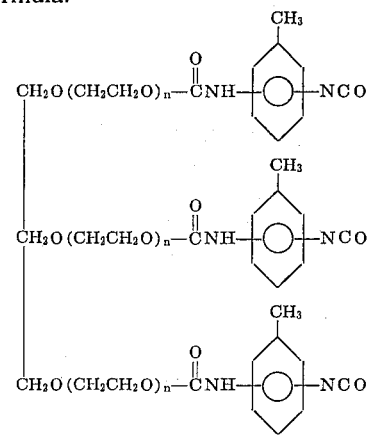

where $n$ has an average value of about 22. The theoretical molecular weight of the resin product is about 3615. To 100 grams of the recovered capped resin was added with stirring 1000 grams of slurry containing 50 percent by weight cordierite in water. A cream time of about 6 seconds was noted. The rise time was about 3 minutes and the cure time was about 5 minutes. A small uniform open cell structure having cordierite dispersed thereon resulted. The resultant foam composition was dried at 130°C. at 10 Torr to give a dry foamed structure. Firing of the dry foamed structure was effected in an air atmosphere by heating at 150°C. temperature rise/hour until a temperature of 1500°C. was reached. Firing was continued at 1500°C. for 2 hours. A sintered ceramic foam resulted which was free of organic residue and retained the original foamed configuration with about 3 percent shrinkage based on the dry prefired foam.

EXAMPLE 2

To a reaction vessel containing 4,136 grams, representing 1 mole, 4 eq. OH, of a tetrol prepared from sodium methoxide catalyzed reaction of 136 grams pentaerithritol with 4400 grams of ethylene oxide, were added 696 grams of tolylene diisocyanate having about 80/20 mixture of 2,4 isomer/2,6 isomer. The reaction was carried out using the procedure of Example 1. The actual isocyanate content noted was 0.86 meg. NCO/gram relative to a theoretical content of 0.83 meg. NCO/gram. The recovered product was a colorless syrup which solidified at about 35°–40°C., was soluble in toluene and acetone, readily reacts with water, and had the formula:

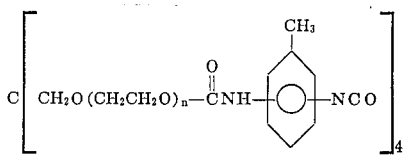

where $n$ has an average value of about 22. The theoretical molecular weight of the resin product is about 4832.

19.2 grams, representing 0.016 eq. NCO, of the recovered capped resin product from this example, were reacted with a slurry of 20 grams water, about 1.1 moles, and 20 grams fine powdered zirconia. The moles $H_2O$/NCO groups was 73.2. The reaction proceeded with a cream time less than 5 seconds, a rise time of 2 minutes, and a cure time of about 3 minutes. The final foam value was about 275 ml. The percent gel was greater than 95 percent. The resultant foam composition was dried at 100°C. at 10 Torr to give a dry foamed structure. Firing of the dry foamed structure was effected in an air atmosphere by heating at 200°C. temperature rise/hour until a temperature of 2000°C. was reached. Firing was continued at 2000°C. for 3 hours. A sintered ceramic foam resulted.

EXAMPLE 3

A solution of 92 grams glycerol representing 1 mole, 3 eq. OH, and 1000 grams of polyoxyethylene glycol 1000 representing 1 mole, 2 eq. OH was outgassed at 100°C. and 10 Torr for 2 hours. To the outgassed solution was added 870 grams representing 5 moles tolylene diisocyanate having an 80/20 mixture of 2,4 isomer/2,6 isomer. The reaction solution was stirred at 60°C. for 4 hours whereupon the actual isocyanate content reacted a constant 2.49 meq. NCO/gram relative to a theoretical content of 2.54. The resin product had a pale orange color, a density of 1.10, and a viscosity (Brookfield No. 4 spindle) at 25°C. of 13,400 cps. 31.3 parts of the resin product representing 50 mole percent had a theoretical molecular weight of 615, and the following formula (idealized):

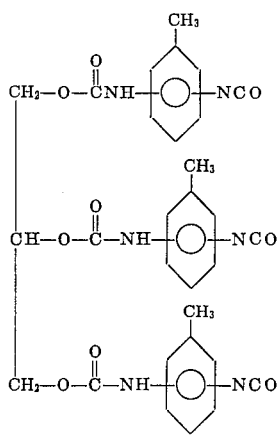

while 68.7 parts of the resin product representing 50 mole percent was found to be

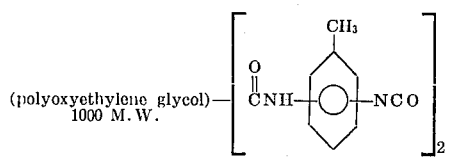

having a theoretical molecular weight of 1348. The actual NCO content of this resin product was 2.49 meq. NCO/gram relative to a theoretical content of 2.54 meq. NCO/gram. To 100 grams of the recovered capped resin was added with stirring 1000 grams of slurry containing 50 percent by weight nickel powder, alkaline earth oxide flux, and a binder. A small uniform open cell structure having nickel dispersed thereon resulted. This wet foam product was heated at 200°C. temperature rise/hour until a temperature of 2000°C. was reached. Firing was continued at 200°C. for 4 hours. A sintered metallic foam resulted which was free of organic residue and retained the original foamed configuration with about 6 percent shrinkage based on the prefired foam.

EXAMPLE 4

The procedure of Example 3 was repeated except using polyoxyethylene glycol having a weight average molecular weight of 4,000. Corresponding results were realized.

EXAMPLE 5

200 grams of diisocyanate capped polyoxyethylene glycol resin product having the formula:

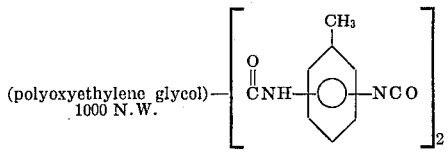

with a molecular weight, theory, of 1348, and an actual NCO content of 1.42 meq. NCO groups/gram relative to 1.49 meq. NCO groups/gram theory, was reacted with a polyamine during foaming using 0.34 grams diethylene triamine (DETA), and 400 grams slurry containing 200 grams water, 50 percent by weight hafnium titanate. The resultant foam composition was dried at 130°C. at 10 Torr to give a dry foamed structure. Firing of the dry foamed structure was effected in an air atmosphere by heating at 150°C. temperature rise/hour until a temperature of 1500°C. was reached. Firing was continued at 1500°C. for 2 hours. A sintered foam resulted which was free of organic residue and retained the original foamed configuration with about 5 percent shrinkage based on the dry, prefired foam. The resultant product was found to have radiation barrier characteristics.

EXAMPLE 6

The procedure of Example 1 was repeated except using a resin prepared by capping a polyoxyethylene diol with a polyisocyanate having a functionality greater than 2, to give polyisocyanate foams with higher crosslink density and superior physical properties, lower solubility, and greater hydrolytic stability than foams from polyoxyethylene diisocyanates. Thus a 1000 gram portion, 0.25 eq. OH, of polyoxyethylene glycol of 4000 weight average molecular weight was outgassed at 110°C. and 10 Torr for 2 hours. Next, to this outgassed liquid was added at 60°C. 200 grams, 0.5 moles, 1.5 eq. NCO, of polymethylene polyphenylisocyanate commercially available under the name PAPI by Upjohn Co. This latter material has nearly three isocyanate groups per molecule and an isocyanate equivalent weight of 133. A dark reaction solution was noted which was stirred at 60°C. to 70°C. for 5 hours whereupon the NCO content reached a constant 0.825 meq. NCO/gram relative to a theoretical value of 0.833. The resultant dark product syrup solidified at 45°C. to form a brown, waxy product. The resultant resin was foamed and fired using the procedure of Example 1. Corresponding results with lower shrinkage were realized.

EXAMPLE 7

In order to illustrate use of copolymers of 75 percent ethylene oxide and 25 percent propylene oxide along with methylene dicyclohexyl diisocyanate to form a triisocyanate that readily reacts with water slurry to give hydrophilic foams for firing, a mixture of 13.4 grams, 0.1 mole of trimethylolpropane and 0.6 grams, 0.01 mole of potassium hydroxide was stirred at 100°–180°C. in the presence of 250 grams of ethylene oxide at 20 to 100 psi. After 3 hours the reaction pressure dropped to one atmosphere. To the reaction product syrup was then added 250 grams of propylene oxide with stirring at 100° to 180°C., and a pressure of 20 to 75 psi for 4 hours whereupon the reaction pressure at 100°C. dropped to one atmosphere. To this reaction product syrup having a brown color was added 500 grams of ethylene oxide. The reaction was stirred at 100°–180°C. for 12 hours whereupon the reaction pressure dropped to one atmosphere at 100°C. The resultant brown oil was stripped of volatiles at 50° to 100°C. at 10 Torr resulting with 978 grams of brown syrup having a hydroxyl content of 0.32 meq. OH/gram relative to 0.31 meq./gram theory.

To 931 grams, 0.30 OH, of the prepared triol was added 88.0 grams, 0.32 moles, of dicyclohexylmethane diisocyanate. The solution stirred at 60°C. for 8 hours whereupon the NCO content of the polymer reached a constant 0.33 meq./gram relative to 0.32 theory. The triisocyanate product was characterized as a light amber syrup having a viscosity of 12,000 cps at 25°C. (Brookfield).

To a 10 gram portion of the above triisocyanate containing 0.1 gram of silicone surfactant L520 by Union Carbide was added with good mixing 20 grams of slurry of water and 50 percent by weight soda-lime silicate. Within 4 seconds a thick creamy froth formed. After 1.0 minute the foam reached its maximum volume of 180 ml. After 3 minutes the foam had a tack free surface.

Firing was effected using the procedure of Example 2.

EXAMPLE 8

In order to illustrate preparation of a flexible hydrophilic foam from a polyoxyethylene polyol having a hydroxyl functionality greater than two, a polyisocyanate plus catalysts and surfactants were all reacted together at the same time in a one shot manner with large amounts of water slurry as follows. 30.9 grams, 0.01 mole having 0.03 eq. OH of polyoxyethylene triol, having a weight average molecular weight of 3092 and prepared as described in Example 1 was mixed with 5.5 grams of diisocyanate, 0.0305 mole, 0.063 eq. NCO, 0.1 gram L520 silicone surfactant by Union Carbide, and 0.05 gram dibutyl tin dilaurate plus 0.05 gram N-methyl diethanol amine. To this mixture was added immediately 100 grams slurry of water and 50 percent by weight cordierite with vigorous stirring. Within 3 seconds, a creamy froth formed. In 2 minutes the form reached its maximum volume of 400 ml., and had a tack free surface after 5 minutes. Firing was effected using the procedure of Example 1. Corresponding results were realized.

EXAMPLE 9

In order to illustrate use of copolymers of 10 percent butylene oxide and 90 percent ethylene oxide along with 4,4'diphenylmethane diisocyanate to prepare a water soluble tetraisocyanate which easily forms hydrophilic foams upon mixing with water slurry, a slurry of 13.6 grams, 0.1 mole, anhydrous pentaerithritol containing 0.5 grams of freshly prepared triethyl oxonium fluoroborate in 250 grams of ethylene oxide was stirred at 50°–100°C. at 20–50 psi for 45 minutes whereupon the pressure dropped to 1 atmosphere. To this brown oil at 10°C. was added a solution of 100 grams tetrahydrofuran freshly distilled from sodium hydride, in 650 grams of ethylene oxide, over a period of 45 minutes. The reaction was stirred at 10°–20°C. for 2 hours, then at 20°–40°C. for 1 hour whereupon the reaction pressure dropped to 1 atmosphere. The resultant brown oil was stripped of volatiles at 50°–60°C. at 10 Torr to give 988 grams of a tan oil having a hydroxyl content of 0.405 meq. OH/gram relative to 0.394 theory.

To 247 grams, 0.1 eq. OH, of the prepared tetraol was added 26.2 grams of diphenylmethane-4,4'diisocyanate, 0.105 mole, and the reaction solution stirred at 60°C. for 5 hours whereupon the isocyanate content reached a constant value of 0.380 meq./gram relative to theoretical value of 0.385. The tetraisocyanate product was an amber syrup having a viscosity of 15,750 cps. at 25°C. (Brookfield).

To a 10 gram portion of the tetraisocyanate containing 0.1 gram of the silicone surfactant L520 by Union Carbide was added with good mixing 10 grams of water with 5 grams spinel. Within 5 seconds a thick creamy froth formed. After 1.5 minutes, the foam reached its maximum volume of 175 ml. After 3 minutes the foam had a tack free surface.

Firing was effected using the procedure of Example 2. Corresponding results were realized.

EXAMPLE 10

A slurry of 100 grams of pentaerythritol, 0.735 moles having 2.94 eq. OH in 860 grams of tolylene diisocyanate, 4.95 moles having 9.9 eq. NCO groups/gram and the mixture ratio 80/20 of 2,4 isomer/2,6 isomer was stirred for 24 hours. An orange solution resulted. To the orange solution was added 1000 grams outgassed polyoxyethylene glycol representing 1 mole having 2.0 eq. OH. These reactants were stirred about 67°C. for 4 hours followed by additional stirring at 25°C. for 16 hours whereupon the isocyanate content reached a constant level of 2.63 meq. NCO groups/gram. relative to theoretical value of 2.56 meq. NCO groups/gram. The resultant product had an orange color, a viscous syrup consistency at 25°C., and upon analysis was found to be a solution of about 31 percent by weight (42.5 mole percent) of the compound:

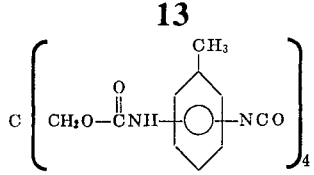

having a molecular weight, theory, of 832, in about 69 percent by weight (57.5 mole percent) of

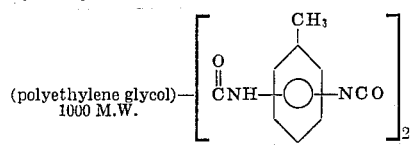

The NCO content of the mixture was 2.63 meq. NCO groups/gram actual, relative to 2.56 meq. NCO groups/gram, theory.

This resin product was foamed and fired using the procedure of Example 1. Corresponding results were realized.

EXAMPLE 11

To 1030 grams representing 1 eq OH of a triol prepared from 92 grams, 1 mole, glycerol and 3030 grams ethylene oxide, were added 168 grams, 1 mole of 1,6-diisocyanatohexane. The reaction solution was stirred at 60° to 70°C. for 6 hours whereupon the isocyanate content of the resin product reached a constant of 0.827 meq NCO/g relative to a theoretical value of 0.835. The resultant pale yellow product syrup solidified to a waxy solid at 35° to 40°C., and was found upon analysis to have the following formula (idealized):

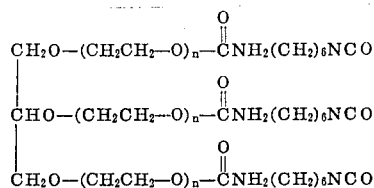

where $n$ is about 25 and the molecular weight, theory, is 3594. The resin product was reacted and fired using the procedure of Example 1. Corresponding results were realized.

EXAMPLE 12

The procedure of Example 5 was repeated except using a polyol during foaming in place of the polyamine. 0.62 gram of the glycerol was used as the polyol. Also, the slurry was composed of 200 grams water and 200 grams soda-lime-silicates. Firing was effected by the procedure of Example 1.

EXAMPLE 13

The procedure of Example 12 was repeated except using a polythiol during foaming in place of the polyol. 12 grams of tetrakis (β-mercaptopropionate) commercially available from Carlisle Chemical Co. under the tradename "Q 43) was used as the polythiol. Corresponding results were realized.

EXAMPLE 14

The procedure of Example 1 was repeated except using gamma-type alumina. 260 grams of the foam product structure was impregnated with a copper nitrate, palladium nitrate, manganese salt, chrome salt solution. The impregnating solution was prepared from commercially available chemicals. Chrome manganese solution was made up by dissolving 250 grams of $CrO_3$ in 420 ml. of water. A total of 148 grams of $MnCO_3$ was then added to the solution. The total solution volume was 600 ml. This solution contained an equivalent of 0.317 gram of $Cr_2O_3$ and 0.187 gram of $MnO_3$ per ml. The copper and palladium components were added to the solution by weighing 36.4 grams of copper nitrate $(Cu(NO_3)_2 \cdot 3H_2O)$ and dissolving the salt in 96.5 ml. of the chrome-manganese solution.

A total of 0.6 ml. of a palladium nitrate solution containing 0.1 gram of palladium per ml. was added to this mixture. Sufficient solution was added to saturate the foam product but leave the surfaces essentialy dry. The impregnated base was then dried at 260°F. The support was reimpregnated and finally dried for 16 hours at 260°F. The dry foam product was next calcined for 3 hours at 1400°F. At this point the impregnated base contained 4 percent by weight CuO, 6 percent by weight $MnO_2$, 10.2 percent by weight $Cr_2O_3$ and 0.02 percent by weight Pd.

The impregnated foam product was found useful as a monolith for catalytic converter used to control emissions in exhaust gases from an internal combustion engine.

EXAMPLE 15

A 2 foot square panel having a thickness of 2 inches was prepared by the procedure of Example 1. The foam panel product was found effective as an acoustical tile, electrical insulator, and thermal insulator using conventional testing procedures. Also, when air having fine particles of dirt was blown through the panel, effective filtration of the particles of dirt was realized.

It will be apparent that the size of the finely divided sinterable ceramic material need only be sufficient to form a water slurry, and form a ceramic structure upon firing.

It is understood that the foregoing detailed description is given merely by way of illustration and that many variations may be made therein without departing from the spirit of this invention.

What is claimed is:

1. A method for preparing ceramic foam structures having three-dimensional networks, said method consisting of, reacting a first component comprising isocyanate capped polyoxyethylene polyol having a reaction functionality greater than two, with a second component comprising aqueous reactant having sinterable material disposed therein, the ratio of moles $H_2O$/moles NCO groups being about 6.5 to about 390 in said second and first components respectively, and thereafter firing to decompose the foam and sinter the sinterable material to a rigid ceramic foam structure.

2. The method of claim 1 wherein the capped polyoxyethylene polyol having a functionality greater than 2 is present in an amount from about 3 percent by weight up to 100 percent by weight, and an additional capped polyoxyethylene polyol having a terminal member with an isocyanate functionality of two is present in an amount from 0 percent up to about 97 percent by weight, and the second component includes about 20 to 1000 parts by weight of sinterable material per 100 parts by weight of said first component.

3. The method of claim 1 wherein the polyoxyethylene polyol moiety of the isocyanate capped member has a weight average molecular weight of about 200 to about 20,000, and a hydroxyl functionality of about 2 to about 6.

4. The method of claim 3 wherein the weight average molecular weight is about 600 to about 6,000.

5. The method of claim 1 wherein the foam is dried prior to firing.

6. The method of claim 3 wherein the ratio of moles $H_2O$/moles NCO groups is from about 20 to about 200.

7. A method for preparing ceramic foam structures having three-dimensional networks, said method consisting of, reacting a first component comprising isocyanate capped polyoxyethylene polyol having a reaction functionality equal to about two, a second component comprising aqueous reactant having sinterable material disposed therein, and a third component comprising a crosslinked agent having a reaction functionality greater than two, the ratio of moles $H_2O$/moles NCO groups being about 6.5 to about 390 in said second and first components respectively.

8. The method of claim 7 wherein the crosslinking agent of the third component is a polyol.

9. The method of claim 7 wherein the crosslinking agent of the third component is a polythiol.

10. The method of claim 7 wherein the crosslinking agent of the third component is a polyisocyanate.

11. The method of claim 7 wherein the polyoxyethylene polyol moiety of the isocyanate capped member has an average molecular weight of about 200 to about 20,000, and a hydroxyl functionality of about 2 to about 6.

12. The method of claim 11 wherein the weight average molecular weight is about 600 to about 6,000.

13. The method of claim 7 wherein the ratio of moles $H_2O$/moles NCO groups is from about 20 to about 200.

14. The method of claim 7 wherein the second component includes about 2 to 1000 parts by weight of sinterable material per 100 parts by weight of said first component.

15. The method of claim 7 wherein the crosslinking agent of the third component is a polyamine.

16. The product prepared by the method of claim 1.

17. The product prepared by the method of claim 7.

* * * * *